(12) United States Patent
Pramod

(10) Patent No.: US 8,925,036 B2
(45) Date of Patent: Dec. 30, 2014

(54) SECURE ENTERPRISE NETWORK

(75) Inventor: John Pramod, Hayward, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/436,332

(22) Filed: Mar. 30, 2012

(65) Prior Publication Data

US 2012/0185915 A1    Jul. 19, 2012

Related U.S. Application Data

(63) Continuation of application No. 11/042,842, filed on Jan. 25, 2005, now Pat. No. 8,166,554.

(60) Provisional application No. 60/548,047, filed on Feb. 26, 2004.

(51) Int. Cl.
  *H04L 29/06* (2006.01)

(52) U.S. Cl.
  CPC ............ *H04L 63/102* (2013.01); *H04L 63/105* (2013.01)
  USPC ............................................................. 726/1

(58) Field of Classification Search
  CPC .............. H04L 2209/60; H04L 65/602; H04L 65/4092
  USPC ............................................................. 726/1
  See application file for complete search history.

(56) References Cited

U.S. PATENT DOCUMENTS

| | | | |
|---|---|---|---|
| 5,774,650 A | 6/1998 | Chapman et al. | |
| 5,787,253 A | 7/1998 | McCreery et al. | |
| 6,219,706 B1 | 4/2001 | Fan et al. | |
| 6,233,577 B1 | 5/2001 | Ramasubramani et al. | |
| 6,292,838 B1 | 9/2001 | Nelson | |
| 6,301,658 B1 | 10/2001 | Koehler | |
| 6,385,653 B1 * | 5/2002 | Sitaraman et al. | 709/230 |
| 6,466,932 B1 | 10/2002 | Dennis et al. | |
| 6,519,571 B1 | 2/2003 | Guheen et al. | |
| 6,553,428 B1 | 4/2003 | Ruehle et al. | |
| 6,622,151 B1 | 9/2003 | Hamamoto et al. | |
| 6,651,099 B1 | 11/2003 | Dietz et al. | |
| 6,662,227 B2 | 12/2003 | Boyd et al. | |
| 6,678,740 B1 * | 1/2004 | Rakib et al. | 709/247 |
| 6,804,701 B2 | 10/2004 | Muret et al. | |
| 6,871,284 B2 | 3/2005 | Cooper et al. | |

(Continued)

FOREIGN PATENT DOCUMENTS

EP    1054529 A2    11/2000

OTHER PUBLICATIONS

Office Action for U.S. Appl. No. 11/398,013, mailed Jan. 20, 2011.

(Continued)

*Primary Examiner* — Jason K Gee

(57) ABSTRACT

A method and system enables transparent authentication and transparent policy enforcement in a fabric of a network. In an exemplary embodiment thereof, a packet stream sent from a network host to a network resource is received at a security system. The security system identifies an authentication exchange packet in the packet stream and determines, using the authentication exchange packet and a directory service, a user identity associated with the packet stream and whether the identified user has authorization to access the network resource. A network policy is created that defines whether the user has access to the network resource.

19 Claims, 4 Drawing Sheets

(56) References Cited

U.S. PATENT DOCUMENTS

| | | | |
|---|---|---|---|
| 6,983,379 | B1 | 1/2006 | Spalink et al. |
| 7,020,082 | B2 | 3/2006 | Bhagavath et al. |
| 7,085,936 | B1 | 8/2006 | Moran |
| 7,133,916 | B2 | 11/2006 | Schunemann |
| 7,216,162 | B2 | 5/2007 | Amit et al. |
| 7,433,943 | B1 | 10/2008 | Ford |
| 7,941,827 | B2 | 5/2011 | John et al. |
| 8,024,779 | B2 | 9/2011 | John et al. |
| 2001/0032258 | A1 | 10/2001 | Ishida et al. |
| 2001/0039579 | A1 | 11/2001 | Trcka et al. |
| 2002/0029260 | A1* | 3/2002 | Dobbins et al. ............ 709/219 |
| 2002/0032855 | A1 | 3/2002 | Neves et al. |
| 2002/0110084 | A1 | 8/2002 | Butt et al. |
| 2002/0131764 | A1 | 9/2002 | David et al. |
| 2003/0061165 | A1* | 3/2003 | Okamoto et al. ............ 705/52 |
| 2003/0135553 | A1 | 7/2003 | Pendakur |
| 2003/0163581 | A1 | 8/2003 | Moran et al. |
| 2003/0172143 | A1 | 9/2003 | Wakayama |
| 2003/0177383 | A1 | 9/2003 | Ofek et al. |
| 2003/0237002 | A1 | 12/2003 | Oishi et al. |
| 2004/0008972 | A1 | 1/2004 | Haken |
| 2004/0030643 | A1* | 2/2004 | Madison et al. ............ 705/39 |
| 2004/0049294 | A1 | 3/2004 | Keene et al. |
| 2004/0071130 | A1 | 4/2004 | Doerr et al. |
| 2004/0078391 | A1 | 4/2004 | Excoffier et al. |
| 2004/0088537 | A1 | 5/2004 | Swander et al. |
| 2004/0117434 | A1 | 6/2004 | Bantz et al. |
| 2004/0128396 | A1* | 7/2004 | Patrick et al. ............ 709/231 |
| 2004/0133589 | A1 | 7/2004 | Kiessig et al. |
| 2004/0210771 | A1* | 10/2004 | Wood et al. ............ 713/201 |
| 2004/0254919 | A1 | 12/2004 | Giuseppini |
| 2005/0050338 | A1 | 3/2005 | Liang et al. |
| 2005/0089048 | A1 | 4/2005 | Chittenden et al. |
| 2005/0114708 | A1 | 5/2005 | DeStefano et al. |
| 2005/0193427 | A1 | 9/2005 | John |
| 2006/0123078 | A1 | 6/2006 | Mendiola et al. |
| 2006/0179140 | A1 | 8/2006 | John et al. |
| 2006/0236370 | A1 | 10/2006 | John et al. |
| 2007/0050846 | A1 | 3/2007 | Xie et al. |
| 2007/0073633 | A1 | 3/2007 | Gallant et al. |
| 2010/0281527 | A1 | 11/2010 | John et al. |
| 2012/0167168 | A1 | 6/2012 | Orr et al. |

OTHER PUBLICATIONS

Notice of Allowance for U.S. Appl. No. 11/398,014, mailed Feb. 28, 2011.
Notice of Allowance for U.S. Appl. No. 11/398,014, mailed Mar. 18, 2011.
Notice of Allowance for U.S. Appl. No. 11/398,028, mailed Jun. 9, 2011.
Office Action for U.S. Appl. No. 11/440,663, mailed Oct. 13, 2010.
Office Action for U.S. Appl. No. 11/398,028, mailed Nov. 3, 2010.
Office Action for U.S. Appl. No. 11/398,013, mailed May 12, 2010.
Office Action for U.S. Appl. No. 11/398,014, mailed Jul. 23, 2010.
Office Action for U.S. Appl. No. 11/398,028, mailed Sep. 2, 2009.
PacketMotion product Overview, print date: 2009.
PacketMotion Corporate Overview, print date: 2009.
PacketMotion Interview, print date: 2009.
Office Action for U.S. Appl. No. 11/398,013, mailed Jan. 9, 2009.
Office Action for U.S. Appl. No. 11/398,014, mailed Jul. 9, 2009.
John Sawyer, "PacketMotion Sentry 2.0.3", Network Computing, Network & System Management, Feb. 13, 2006.
Closing internal User Visibility and Data Governance Gaps with PacketMotion, SANS Institute, Mar. 2008.
Notice of Allowance for U.S. Appl. No. 11/398,028, mailed May 12, 2010.
Office Action for U.S. Appl. No. 11/330,663, mailed Mar. 3, 2010.
Notice of Allowance for U.S. Appl. No. 11/398,014, mailed Feb. 23, 2010.
Hassler, V., "X.500 and LDAP Security: a comparative overview," Network, IEEE, vol. 13, Issue 6, Nov.-Dec. 1999, pp. 54-64.
Claycom, W.R. et al., "Threat modeling for virtual directory services," Security Technology 2009, 43rd Annual 2009 International Carnahan Conference on Oct. 5-8, 2009, pp. 149-154.
Yang, C.S. et al., "Design and Implementation of Secure Web-based LDAP management system,", Information Networking, 2001, Proceedings, 15th International Conference on Jan. 31-Feb. 2, 2001, pp. 259-264.
Junaid, M. et al., "Per Packet Authentication for IEEE 802.11 wireless LAN", Multitopic Conference, 2008, INMIC 2008, IEEE International Publication Year: 2008, pp. 207-212.
Huang C. et al., "One Pass Authentication and Key Arrangement Procedure in IP Multimedia Subsystem of UMTS," Advanced Information Networking and Applications, 2007. AINA '07, 21st International Conference on Publication Year 2007, pp. 482-489.
Iqbal, M.S. et al., "Packet Level Access Control Scheme for Internetwork Security," Communications, Speech and Vision, IEE, Proceedings I, vol. 139, Issue 2, Publication Year 1992, pp. 165-175.
Office Action in U.S. Appl. No. 11/042,842, mailed Feb. 12, 2009.
Office Action in U.S. Appl. No. 11/042,842, mailed Sep. 21, 2009.
Office Action in U.S. Appl. No. 11/042,842, mailed Mar. 8, 2010.
Office Action in U.S. Appl. No. 11/398,014, mailed Jul. 23, 2010.
Office Action in U.S. Appl. No. 11/042,842, mailed Oct. 13, 2010.

* cited by examiner

SECURE ENTERPRISE NETWORK

This application is a continuation of U.S. application Ser. No. 11/042,842 filed Jan. 25, 2005, issued on Apr. 24, 2012 as U.S. Pat. No. 8,166,554 which claims priority to and the benefit of the filing date of U.S. Provisional Application No. 60/548,047, filed on Feb. 26, 2004.

What is proposed is a method of implementing a security system (Packet Sentry) addressing the internal security problem of enterprises having a generalized approach for inferential determination and enforcement of network policy with directory service based group correlation. The authentication of the connected customer and the policy enforcement inside the fabric of the network is handled in a transparent way. The system provides the network with the ability to analyze and enforce policy using any bit of the packet. The network will be able to conduct Flow Vector analysis on the data traffic, provide Application Monitoring, Normalization and user authentication validation. The system will enable the network to implement Group relationship Analysis and correlation using combination of Network inferences and Directory service data resulting in generation of Group norms using statistically significant relations ships. These in turn will provide for a more secure enterprise environment where the required levels of data security can be enforced and the usage monitored effectively in the enterprise infrastructure. The security system that is proposed is capable of enforcing the policy on the basis of any bit or bits in a stream.

FIELD OF INVENTION

This invention relates to providing security for an enterprise, taking into consideration key factors such as people, processes, and policies of the enterprise (operational versus technology based security) and group resource usages.

PRIOR ART

Most if not all of the prior art is focused on preventing external entities breaching or trying to breach the security of an enterprise. Current products such as Fire Walls, Intrusion Prevention Systems (IPS), and Anti-Virus Gateways cannot provide adequate protection as they were designed to protect the perimeter and do not understand the application and the Directory centric view of the global enterprise whose vulnerability is mainly internal, where the IPS and operational details on a global scale are exposed to all in the enterprise. Of course there are pass words and other limited security modules that protect the resources, but these do not really provide a network of security. Securing the total network in view of the evolution of a corporate network and its relationship to the internet, which has evolved a much more fluid concept of what is inside and what is outside, is a problem that has not been addressed yet. Unwanted and unauthorized insider access to critical data, which is highly vulnerable to unauthorized decimation has been shown to be a major problem in FBI/CSI reports of 2003. The problems of current solutions are multiple 1. Existing technology was developed to protect the enterprise from attacks through its perimeter. Internal intrusions are not considered as problematic. The internal challenge faced by the enterprises hence cannot be addressed by these solutions.
2. The current solutions due to their nature do not understand what need tom be secured. The lack of understanding of the data flowing in the data path in an enterprise today is opaque to the administrator. Hence it has no way of monitoring and securing the network against internal access by unauthorized users.
3. The integration or modifications of pieces of current technology cannot be used to solve the problems faced by the enterprise as the design requirement for securing internal resources are completely different from those for securing the periphery of the network.

OBJECTS AND ADVANTAGES OF THE DISCLOSED METHOD

What is proposed is a general method of taking an arbitrary data stream, breaking up the stream into the individual flows and then using the directory service information to correlate the flow to the user that the flow belongs to. More generally this information can be aggregated to understand the network policy, i.e. what groups of users have access to and are using what resources (applications) within the larger context of the enterprise.

Another objective is to provide transparent authentication of the user and a valid policy associated to him in the framework of the network. This approach transparently verifies that authentication has taken place but does not need to participate in the actual authentication. This is achieved by generating user's network access policy transparently (without need to log into yet another device) and then enforcing it at the network-level.

A third objective of the disclosed method is to use a vector flow analysis, using the direction and magnitude of data flows and have a statistical analysis over time of the magnitude and direction of the vectors. From this it is possible to gain an understanding of standard information flows, deviations from the group norm and directionality of information flow (i.e. information flows leaving, entering and within the organization). This flow vector statistics will help to identify and control abnormal behavioral patterns and prevent or restrict unauthorized access.

A fourth objective is to monitor each users behavior on a network and identify aberrant behavior patterns when they occur and limit or eliminate such behavioral flows from the network to preserve the secure nature and availability of network for normal operation A fifth objective is to understand the relationships between various directory service groups and resources on the network. This group relationship analysis and correlation using combination of directory service data, and network inference provide a basis for group norms based on statistically significant relationships between groups and resources in the network. This in turn can form a meter for the generation and implementation of the group level policy on network.

A sixth advantage is the ability of the scheme to analyze any bit or bits in the data stream as a means for policy enforcement. The data stream can be correlated to metadata and any analyzed data or metadata can be used for dynamic policy creation and enforcement based on any bit or bits in the data stream.

SUMMARY OF INVENTION

A Security system, Packet Sentry (PS), solution is proposed for the internal security problem of enterprises having a generalized approach for inferential determination and enforcement of network policy with directory service based group correlation. The PS handles the authentication of the connected user and the policy enforcement inside the fabric of the network in a transparent way, such that the connectivity and access that the customer has in the network follows pre defined policy and group norms. Using the capabilities provided by PS, network will be able to conduct Flow Vector analysis on the data traffic to determine normal patterns of data flow, and use this information to generate and control policy based on application usage provide Application Monitoring, provide more efficient Normalization of network resource usage and determine and restrict abnormal behavior. The Packet Sentry system will enable the network to implement Group relationship Analysis and correlation using combination of Network inferences and Directory service data resulting in generation of Group norms using statistically significant relations ships. These in turn will provide for a more secure enterprise environment where the required levels of data security can be enforced and the usage monitored effectively in the enterprise infrastructure based on group structures and levels of secure connectivity. The PS security system that is proposed is capable of enforcing the policy using analysis on any bit or bits in a stream. This in turn provide flexibility to the system administrator to define and enforce policy that is not restricted to any segment of the data stream.

DESCRIPTION OF THE INVENTION

What is described is a general method of taking an arbitrary data stream, breaking up the stream into the individual flows and then using the directory service information to correlate the flow to the user that the flow belongs to. More generally this information can be aggregated to understand the network policy, i.e. what groups of users have access to and are using what resources (applications) within the larger context of the enterprise. Traditionally vendors have focused on providing network policy as a function of the physical characteristics of the flow (i.e. IP address, port) rather than the identification of the user associated with the flow which represents a logical view of the network and policy. This approach is unique for several reasons:

1. Network Policy is related logically into the directory services rather than physical aspects.
2. Analysis and Enforcement engines are combined together at a physical point to provide both functions.
3. Both the Analysis and Enforcement engines can be linked to the directory services as the basis for policy.
4. This approach allows the directory services information (i.e. groups, users) to be linked not only to access policies but to traffic policies such as Quality of Service.

Figure 1:
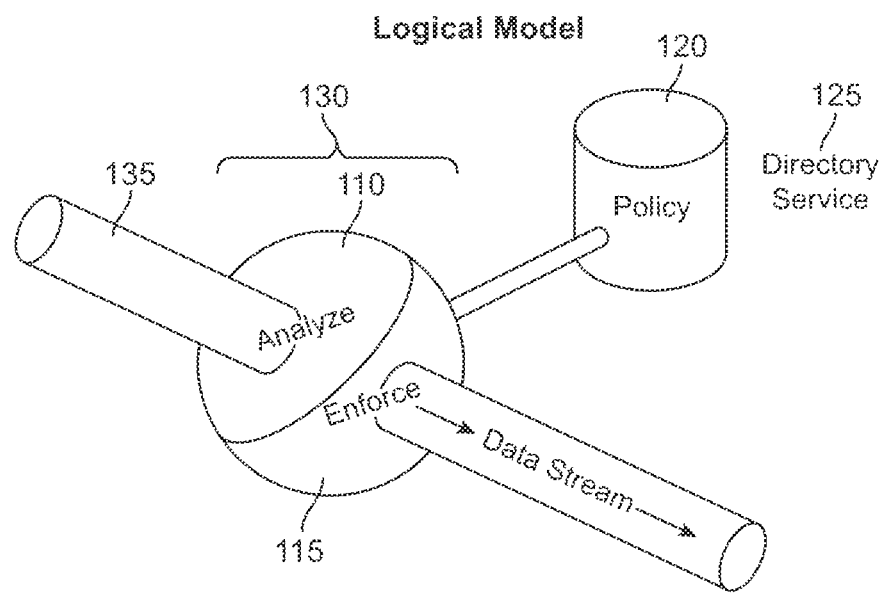
FIG. 1: The logical model showing the generalized approach for inferential determination and enforcement of network policy with directory service based group correlation.

A general picture of the process is depicted in FIG. 1. In this drawing the device which we shall refer to as a Packet Sentry, possesses both an analysis engine to relate the traffic to the directory services policy, and an enforcement engine that can now provide enforcement based on the directory services policy and the results from the analysis engine.

An example of a physical implementation of the Analysis and Enforcement is as follows: The directory server is a machine running Microsoft's Active Directory. The Packet Sentry is connected between two Cisco Routers/Switches. The Packet Sentry in real-time analyzes the traffic, communicates with the directory server and appropriately enforces policy on traffic that passes between it.

Figure 2:
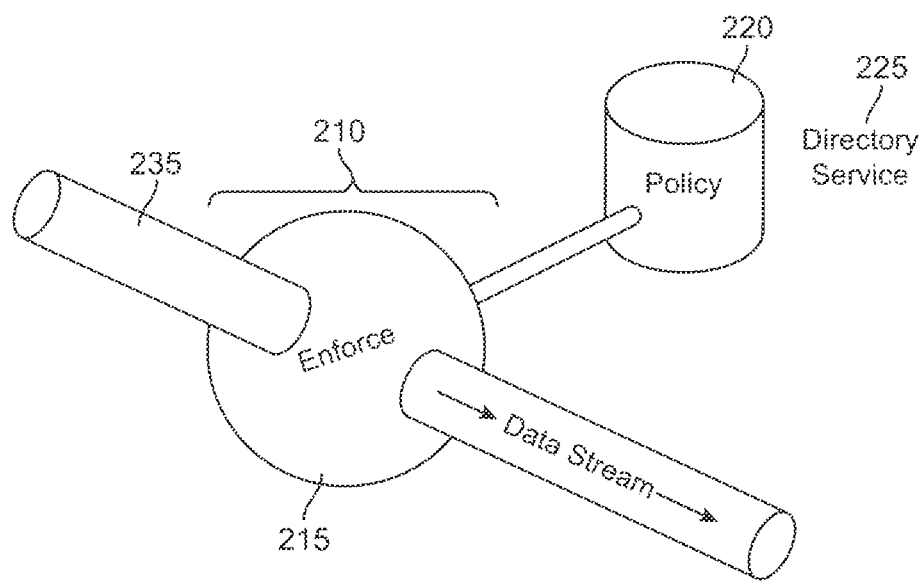
FIG. 2: Example of Policy Enforcement only sub-case of the generalized approach in FIG. 1.

A sub-case of the general case is depicted in FIG. 2. In this drawing the Packet Sentry, possesses only an enforcement engine that can now provide enforcement based on the directory services policy.

An example of a physical implementation of this is: The directory server is a machine running Microsoft's Active Directory. The Packet Sentry is connected between two Cisco Routers/Switches. The Packet Sentry communicates with the directory server and appropriately enforces policy on traffic that passes between it.

Figure 3:
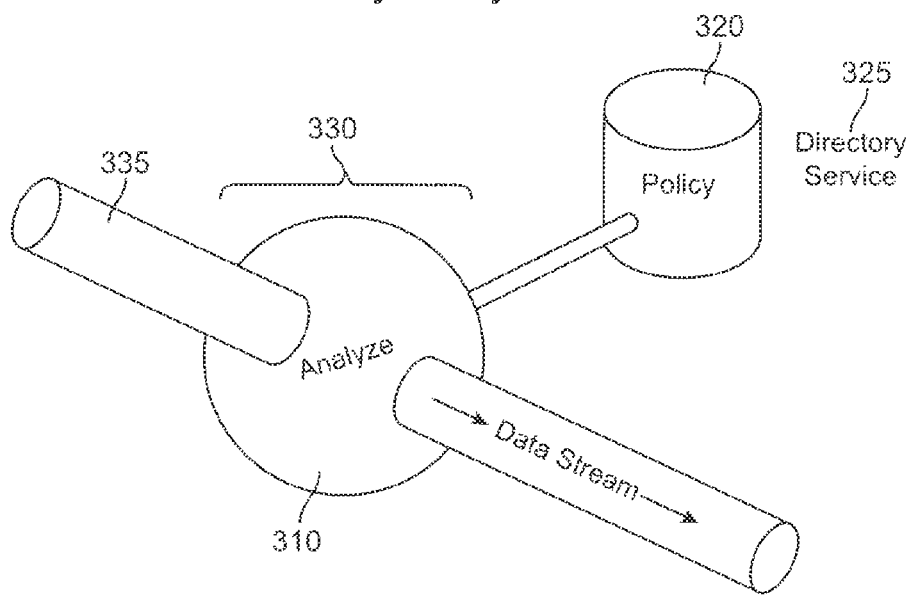
FIG. 3: Example of Analysis only sub-case of the generalized approach in FIG. 1.

Another sub-case of the general case is depicted in FIG. 3. In this drawing the Packet Sentry, possesses only an analysis engine to relate the traffic to the directory services policy. In this case it does not modify the data stream.

An example of a physical implementation of this is: The directory server is a machine running Microsoft's Active Directory. The Packet Sentry is connected between two Cisco Routers/Switches. The Packet Sentry in real-time analyzes the traffic, communicates with the directory server and determines the policy in the network.

How does use of PS in the general scheme increase the level of security?

- It allows policies to be defined based on analysis of the traffic to understand the actual applications.
- It allows the directory service which has traditionally provided the definition of the roles and groups within the enterprise to be enforceable in the network.
- It allows the connection of the users, based on directory services to the applications, based on analysis by the Packet Sentry.
- It allows not only access policies to be implemented in the network, but also traffic related policies such as Quality of Service.

The competition generally has taken the traditional approach in the following ways:

- Keep Enforcement and Policy Analysis separate
- Provide physical layer policy analysis (i.e. IP address based)
- Provide physical layer policy enforcement (i.e. IP address based)

The solution disclosed is the first to integrate the concept of directory service based analysis and enforcement for data streams. Some Unique features of Packet Sentry in this area are:

1. Its ability to do Transparent Authentication Verification and Transparent Policy Enforcement in the Fabric of the Network.
2. Its capability to do Information Flow vector analysis.
3. The ability for application monitoring, normalization, user behavioral check and user authentication validation on an individual and group level.

4. Capability to perform group relationship analysis and correlation using a combination of network Inference and directory services data, resulting in group norms generation using clear cut and statistically significant relationships.
5. Ability to support Policy Analysis and Enforcement using AnyBit.

A description of the Unique features enumerated above is given below.

The first additional unique feature of the Packet Sentry is its ability to do Transparent Authentication Verification and Transparent Policy Enforcement in the Fabric of the Network. Ref FIG. 4.

The Packet Sentry is able to generate any users network access policy transparently (no need to log into yet another device) and then enforced at the network-level. This approach transparently verifies that authentication has taken place but does not need to participate in the actual authentication. This feature shown in FIG. 4.

Figure 4:
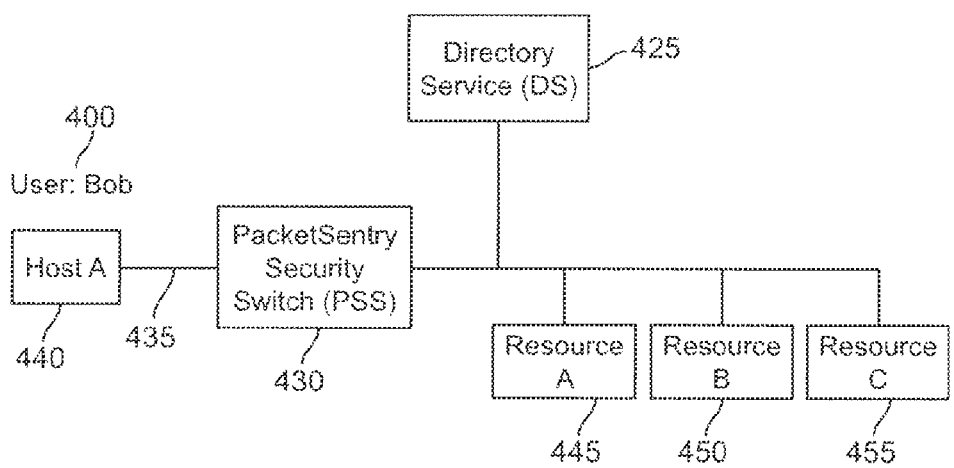
FIG. 4: Transparent Authentication verification scheme block diagram.

As an example in FIG. 4,
1. Bob logs into his machine and is authenticated via the Directory Service (DS)
2. Bob is identified by the Packet Sentry through one of three methods:
3. Via sniffing of the authentication traffic
4. By making a query to the DS
5. By querying Host A
6. Bob is linked temporally to Host A
7. Bob's group information is retrieved from the DS and cached on the PS
8. Each PS has policies internally that map applications on Resource A, B and C to groups in the DS
9. When Bob tries to connect to an application on Resource C, a dynamic policy is created between Bob at Host A and the application on Resource C consisting of drop, allow, rate limit, log, etc.
10. Bob's authentication policy for accessing the application on Resource C has been translated into a network-level policy dynamically by the PS.

PS validates the user has valid credentials via a connector to the directory service (MS Active Directory, Novell Directory Services, LDAP, etc.). This is done using five methods that are transparent on the network, eliminating the need for desktop agents. This also guarantees that all legacy applications will work without the need for application-level modifications.

a. Look Ahead Verification: The Packet Sentry monitors and disassembles all authentication traffic that crosses the device. It extracts the username from the data packets and inspects the remaining data flow to verify whether the authentication request was successful. If authentication was successful, the user's access policy is looked-up in the Packet Sentry's cache, if it is not found the policy is retrieved from the directory service while the authentication is in progress. From this point a dynamic application policy is created and populated into the AnyBit Enforcement Engine described later.

b. Cached Verification: The dynamic application policy is cached until the aging timer has expired. The aging timer starts from the end of the last seen traffic that matches that policy. This setting is customizable by the administrator.

c. Background Session Verification: An approach to prevent delay while authentication is being performed if no cached or look-ahead verification is possible. When the first packet arrives, the packet is allowed to pass through the Packet Sentry while a lookup request is made to the directory service. The session is allowed to continue until the dynamic application policy is created and determines the appropriate course of action. In this manner no delay is involved with session initialization.

d. Reverse Query of Host: This approach makes use of the fact that in many Operating Systems, it is possible to make a query back to the host to discover who the logged in users are. We then use this user information to request information from the directory server.

e. Agent Deployed on Directory Services (DS) Servers or Log consolidation servers: This approach uses a lightweight agent that monitors when logon/logoff (authentication) requests are made either by using the API's exported by the DS applications or by log messages generated by the DS applications. The users information (username/host) is recovered in this manner and then sent to our Global Security Manager (GSM). Log messages can either be parsed on the actual directory servers themselves or via centralized machines that perform log consolidation.

The level of security in the network is increased by the transparent verification scheme. It happens by providing the capability in the network where by:
1. Sessions (streams of packets) are not allowed to traverse the network unless proof of valid authentication in the enterprises directory service exists
2. This is a simpler paradigm to understand. For example, the policy at the network-level is the same as that at the application-level (intuitive policy)
3. This is the most secure security technique that exists for compartmentalizing users (except, of course, using an air gap)
4. Most attacks (misuse, exploits) etc. are the result of network-level (packet) attacks. By design, all such attacks are dropped automatically, decreasing the risk to the organization by an order of magnitude.

The competition or prior art does not follow this procedure. No verification on network level is done but only in access control hence it is unique in multiple ways.
1. This is a very novel concept; the inventor is unaware of any other potential competitor addressing the problem in this manner. This is why it is so intriguing to users.
2. In the network and firewall space there is nothing with this level of user-based understanding.
3. In the access control space there are companies like Oblix and Netegrity that offer server based authentication control. The PS solution extends this multiple levels further, into the fabric of the network itself; therefore also preventing attacks that attack the underlying operating systems that might be hosting authenticated applications.
4. By design this is fundamentally more secure. Only 'allowed' traffic is permitted to traverse the network and reach the resources. All other traffic is automatically dropped. Psychologically, users who have access to resources rarely try to break into them, while ones that do not have access are the likely sources of malicious penetrations. These users are thwarted by the fabric of the network.
5. This is a simpler paradigm to implement
6. The verification authentication scheme does not care about the underlying source of traffic (wireless, wire line, VPN, etc.)

As an example of what is done in transparent validation,
John is a member of the Engineering group but not a member of the Finance group. He attempts to access a resource in the Engineering group and is transparently allowed to do so. He tries to access a resource in the Finance group and his packets are transparently dropped which prevents him from connecting to the resource. This is done automatically by the permissions sets in the directory services.

802.1x in the network based authentication world: This is the authentication protocol to authenticate users into a port based network. The PacketMotion's Packet Sentry transparently goes beyond this to not only verify authentication, but to also enforce the correct policy. This is the strongest network authentication and enforcement system available that is independent of the type of underlying network (wire line/wireless).

Figure 5:
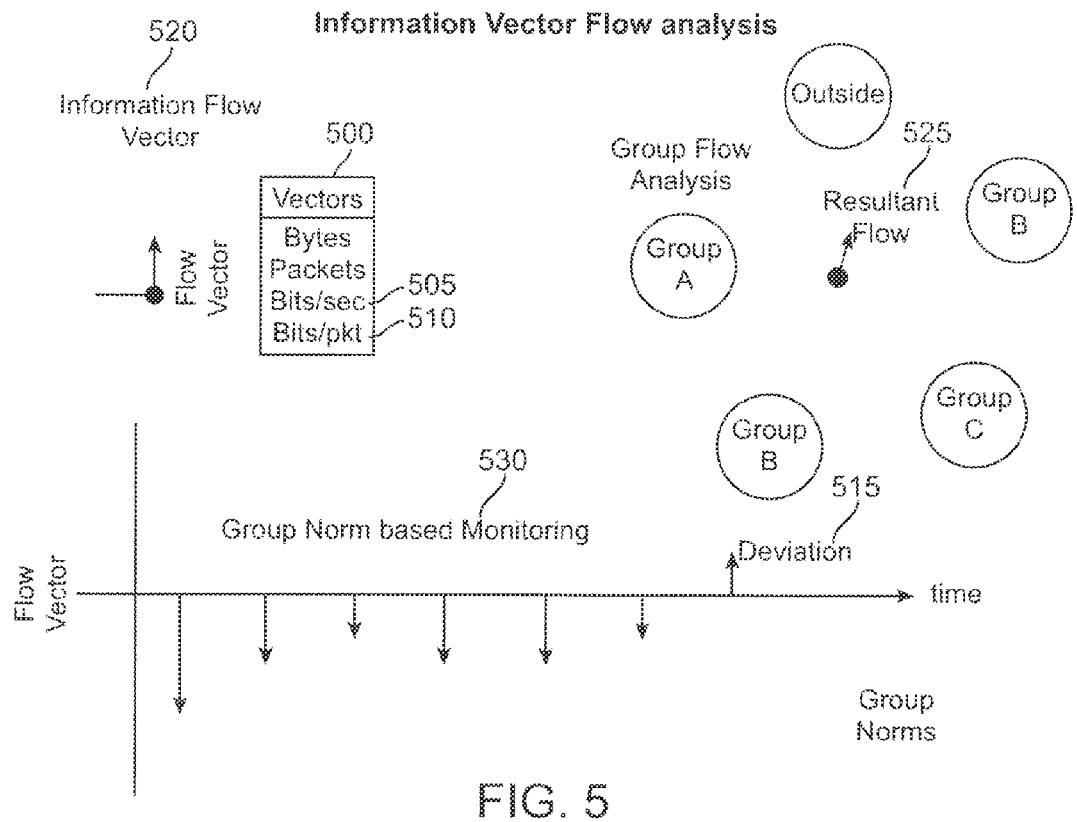
FIG. 5: The diagram showing the concepts of Information Flow Vector, Group flow analysis and Group Norm based monitoring.

The second unique feature of the Packet Sentry is the capability to do Information Flow vector analysis. Ref. FIG. 5

Packet Sentry has the capability to create vectors based on the characteristics of the flows such as:
  bit rates
  packet sizes
  ratios of data packets to control packets
  ratios of forward to reverse flows
  content weighted rates By analyzing the directionality of the vectors and using statistical analysis over time of the magnitude and direction of the vectors, it is possible to gain an understanding of standard information flows, deviations from the group norm and directionality of information flow (i.e. information leaving the organization).

Packet Sentry is able to define three levels of activities with respect to vectors:
  a. Information Flow Vector: The base vector is composed of the sum of inbound and outbound traffic for various parameters and aggregate groups of vectors (i.e. all flows that belong to a certain application etc.)
  b. Group Flow Vectors: Generate the vector sums independently for information vectors where each axis is a group that the node is a member of. Then generate a resultant vector sum.
  c. Group Norm based Monitoring: Generate group normative ranges based on statistical comparison to other members of group. Generate alerts based on deviations from the group norm for individual nodes.

This is achieved by using the power of hardware acceleration to compute large tables of information flow vectors in real time for each flow of packets. These flow vectors can be aggregated across common axes to provide multi-dimensional aggregate data. The data id collected and analyzed historically to understand a user's information usage and compared statistically to other members of that users group.

This flow vector analysis can have a direct impact on how the security of the network can be improved.
  Packet Sentry is able to Monitor usage patterns and provides a way of measuring what resources are being used and the directionality flows (from inside an organization to the outside, from Server B to host A).
  Uses aggregate flow data, to understand what normative application behavior is and prevent 'run away applications' (email storm, virus/worm replication etc).
  Packet Sentry Inferentially understand how data flows in an enterprise from a usage, resource and information perspective. There is no requirement for Packet Sentry to understand the specifics of every application, which is a non-tractable problem, byt only the trends and statistics. The approach allows high accuracy of group identification due to directory services-based approach as opposed to a statistically inferred concept of group.

At the present time as far as the inventors are aware, no other security scheme has planned the capability to use flow vectors and behavioral patterns to monitor the network.

An example of the operation is as follows:
  User logs into Yahoo mail and sends a document outbound from the organization. PS detect flow direction change of web traffic (normal data flows for web applications are from server to client, but in this case, the data significantly changes direction when the flow goes from client to server).
  User has an application that is transported via an encrypted protocol (secure web-based mail or encrypted IM) to send a document outbound from the organization. PS detect flow direction and rate vector changes and conclude that a file is being sent.

Figure 6:
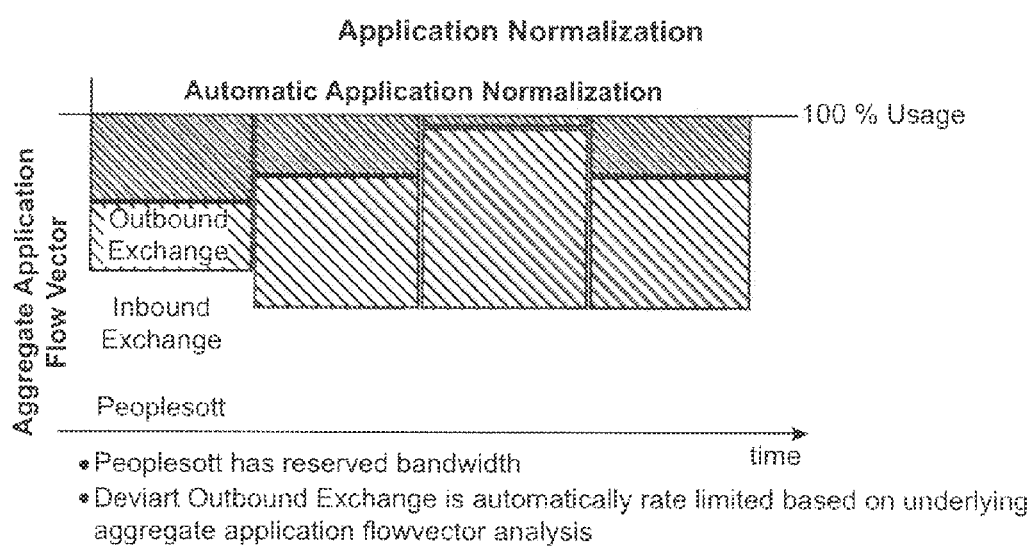
FIG. 6: Automatic normalization of flows in the network based on application flow vector analysis.

A third unique feature of the Packet Sentry is the ability for application monitoring, normalization, user behavioral check and user authentication validation on an individual and group level. Ref. FIG. 6

In this case Packet Sentry continuously monitor applications and users as they interact on a network. When an application or user's behavior deviates from preset policy or computed norms, the applications rate limited (limited to use less bandwidth or dropped dependent upon policy). This preserves the availability of the entire network. For example in FIG. 6 When the rate for outbound or inbound email (exchange) exceeds application norms that are based on underlying application flow vector analysis, the rate of out bound, in this case, is automatically limited. This prevents applications from running out of control and bringing the network down. This is done by The Packet Sentry switch constantly monitoring the traffic and creating a 3 dimensional model using time, application and user statistics. One unique characteristic is that all of these are linked by the intelligent flow analysis scheme. This leveling operation protects the network by preventing users or applications from being able to bring the network down by means of intentional (viruses/worms) or unintentional (accidental) means. This makes the network automatically resilient at the application-level. We take the concept of the application and overlay it on the underlying network.

The competition in this field consist of companies like Packeteer and Sitara, but their solutions are focused on optimizing bandwidth on low-speed, expensive WAN links and not the high-speed internal network.

When the inevitable next big worm comes along it will most likely propagate itself via scanning for vulnerabilities in other systems. The Packet Sentry will stop the spread of the worm by (a) limiting the number of hosts that the worm can "see" to just those that belong to the same group as the infected host and (b) by limiting what applications (ports) the infected host can get to on those other hosts.

As an example of accidental over load:
A large financial corporation relayed the story about users responding to an email-based Amber alert about a lost child. The users were carbon copying everyone they could think of as well as replying to the all employees group about not seeing the child. In a matter of minutes, not only was the corporate email system overloaded, but also the corporate network was brought to its knees. The Packet Sentry solution would recognize that the corporate email system was behaving in an abnormal fashion and rate limit down the email traffic so the other applications that needed to exist on the network could function properly.

Figure 7:
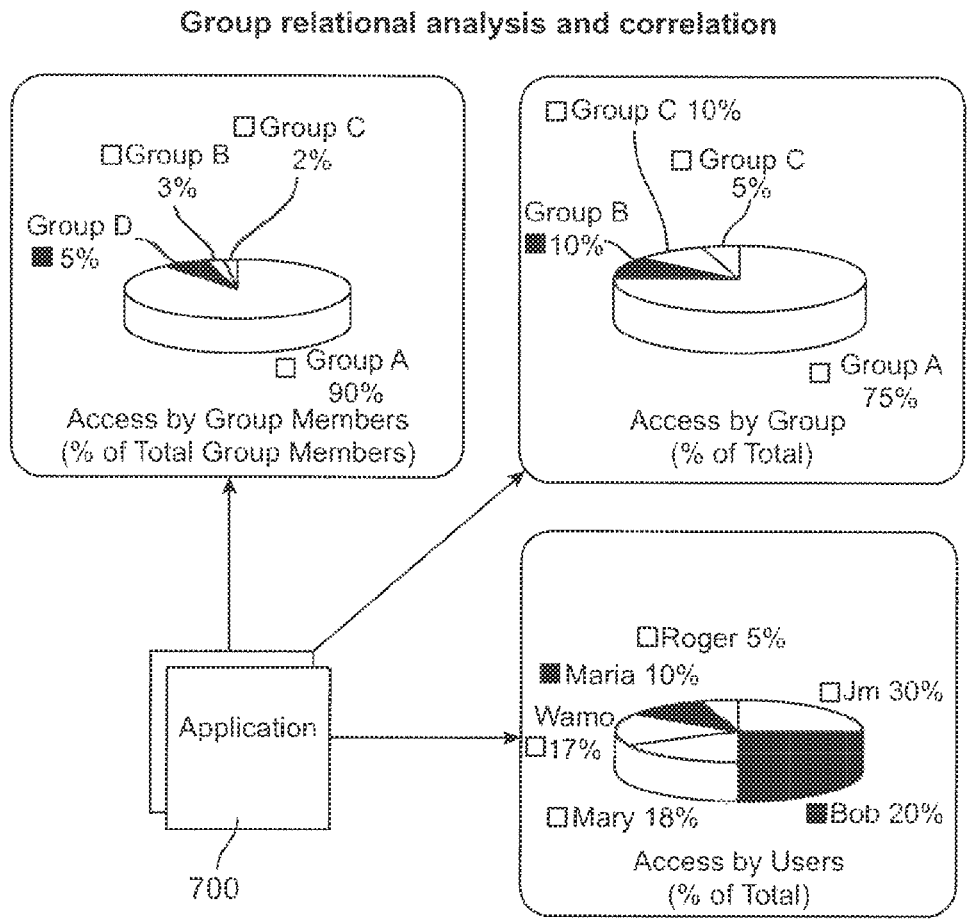
FIG. 7: Example of Group relationship analysis and correlation using a combination of Network Inference and Directory Services Data, resulting in group norms generation using clear cut and statistically significant relationships.

A fourth unique feature of the Packet Sentry is its ability to conduct Group relationship analysis and correlation using a combination of network Inference and directory services data. Group norms are generated from this analysis using statistically significant relationships for use by the Packet Sentry. Ref: FIG. 7. These relationships are also used to understand the typical resource to user group interactions which are formalized as policy and implemented by the Packet Sentry. When abnormal patterns are seen in the group to resource relationships these are scrutinized and if necessary corrective action taken to protect and safe guard the network.

Packet Sentry determines inferentially the relationship between directory services groups (such LDAP, NDS and Active Directory) and correlate it to the traffic that is on a network. This makes it possible to understand from a network-level which groups access a resource and then to understand statistically significant relationships of the groups to which the users who access the resources belong. This translates to the actual policy at that point of analysis.

FIG. 7 is a graphical depiction of a random Application A. For this application, the analyzer has determined the group distributions where the groups are directly taken from the directory service. It also breaks down usage by actual user. All traffic is disassembled and data on users and the applications they access are generated. This data is correlated using the group information for each user in the directory service. Using statistical analysis Packet Sentry can determine the most likely groups that should have access to those resources and the groups that should not have access to it based on the transparent analysis of past successful and failed connections.

Packet Sentry makes no inference on group memberships; therefore the error in finding statistically significant groupings is virtually non-existent. This is as far as the inventor knows the only approach that can distinguish between multi-group collisions. I.e. when a user is a member of more than one group, determining which group is the primary group.

As an example of how this works, Members of the Admins, Global Admins and Sales try to connect management port of the global SSO server. The statistical analyzer suggests that Admins and Global Admins should have access to the resource, but Sales should not. Hence any connection from the primary sales group is prevented from making the connection. If the group member from sales is also a member of the Admins group that connection is allowed.

By having a complete picture of policy of each enterprise resource and what groups (roles) have access to individual resource, and then allowing automatic policy creation to prevent access by other groups at the network-level, Packet Sentry is able limit unauthorized and unwanted access to resources and hence protect the data and resource from being corrupted.

Currently as far as it is known no competitors using this approach. Some of the IDS/IPS companies statistically attempt to understand groups, but this is very error prone and subject to high failure rates (false positives/negatives).

A fifth unique feature is the ability of the Packet Sentry to create policies and enforce them using information available on any bit or bits of the stream.

That means that any or all bits in a data stream can be analyzed and used for policy enforcement. The data from this stream can be correlated into metadata—such as information flows. Any analyzed data or metadata can be used as the basis for creating dynamic policies that can be enforced using any combination of bits in a stream or characteristics of the flow.

Figure 8:
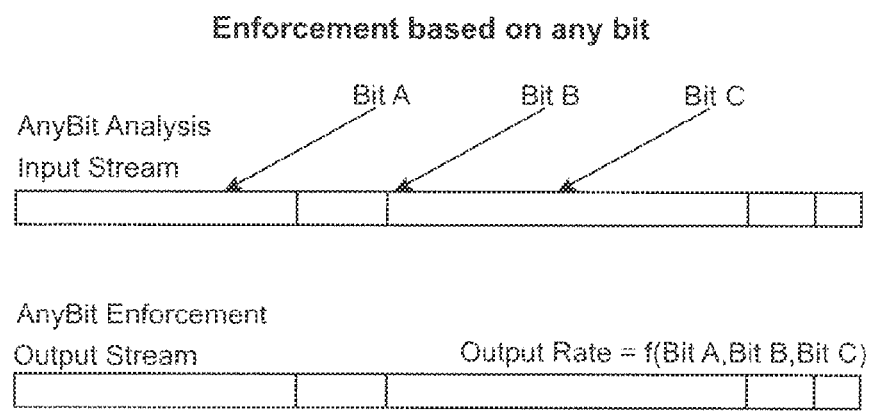
FIG. 8: Example of Policy analysis and enforcement using any bit.

Referring to FIG. 8, any group of bits (source address, destination address, ECN bit, etc.) can be analyzed using regular expression and bit masking techniques. This also generates metadata about the analyzed data, e.g., bits/sec. Any of the previous data can be used to construct an enforcement rule that can act on the data and streams directly, based on the occurrence of any bit or bits of a recognized type identified by the policy.

This any bit analysis and enforcement is done by specialized hardware used for deterministic analysis using hardware hashing, regular expression matching and metadata creation (flow vectors, statistics).

As an example of this,

Stop a user who tries to send a file outbound that deviates from what others in her group are sending by 15%.

Policy=If for User (flow vector direction=outbound) and (flow vector magnitude>1.15*(norm for group A)) drop flow.

Currently this method is not used to increase the security of the network by any one. Use of Packet Sentry allows additional analysis that is not available today to provide data for decision making (human/machine). It also allows flexible policy creation that is not based on traditional source/destination/port. The Packet Sentry provides for very large tables of policy that accommodate tens of thousands of users.

Another example of this is the use of any bit analysis to mark packet streams for QOS applications. A real life implementation will be in diffserve.

Other unique features and modes of implementation methods will be possible to individuals who are experienced in the field based on their understanding of this application. This patent application hence does not exclude any such implementations from being undertaken.

What is claimed is:

1. A method of implementing a security system that enables transparent authentication and transparent policy enforcement in a fabric of a network, the method comprising:
   receiving, after an authentication process, a packet stream sent from a network host prior to the packet stream reaching a network resource comprising access to one or more applications;
   identifying an authentication exchange packet in the packet stream, the authentication exchange packet being associated with the authentication process, wherein the authentication exchange packet includes authenticated information;
   determining, using the authentication exchange packet and a directory service, a user associated with the packet stream and whether the user has authorization to access the network resource and the one or more applications; and
   creating a network policy based on the identifying and the determining, the network policy defining whether the user has access to the network resource and the one or more applications.

2. The method of claim 1, further comprising associating the user with a group of users in the directory service that have the same network policy.

3. The method of claim 1, further comprising enforcing the network policy by stopping the packet stream from reaching the network resource when it is determined that the user does not have access to the network resource.

4. The method of claim 1, further comprising:
   monitoring a usage, a resource, and content of information sent by or received by each member of a group;
   updating the network policy for each member of the group based on the monitoring, the updated network policy including usage thresholds, approved resources, and approved content of information; and
   enforcing the updated network policy by preventing certain information from being sent by or received by a member of the group when the certain information exceeds the usage thresholds, is not from an approved resource, or does not include approved content.

5. The method of claim 1, further comprising:
monitoring a rate at which information is sent by or received by a group of users;
generating a network policy for the group based on the monitoring, the network policy for the group including information rate thresholds; and
enforcing the network policy of the group by reducing a rate at which information can be sent by or received by the group when the rate at which information is sent by or received by the group exceeds one or more of the information rate thresholds.

6. The method of claim 1, wherein determining a user associated with the packet stream comprises:
extracting a username from the packet stream; and
using the directory service to determine a user associated with the username.

7. A system comprising:
a directory server comprising user information, user authorization information, and network policy information; and
at least one processor programmed to:
receive, after an authentication process, a packet stream sent from a network host prior to the packet stream reaching a network resource comprising access to one or more applications;
identify an authentication exchange packet in the packet stream, the authentication exchange packet being associated with the authentication process, wherein the authentication exchange packet includes authenticated information;
determine, using the authentication exchange packet and the directory server, a user associated with the packet stream and whether the user has authorization to access the network resource and the one or more applications; and
create a network policy based on the identifying and the determining, the network policy defining whether the user has access to the network resource and the one or more applications.

8. The system of claim 7, wherein the at least one processor is further programmed to associate the user with a group of users in the directory server that have the same network policy.

9. The system of claim 7, wherein the at least one processor is further programmed to enforce the network policy by stopping the packet stream from reaching the network resource when it is determined that the user does not have access to the network resource.

10. The system of claim 7, wherein the at least one processor is further programmed to:
monitor a usage, a resource, and content of information sent by or received by each member of a group; and
update the network policy for each member of the group based on the monitoring, the updated network policy including usage thresholds, approved resources, and approved content of information.

11. The system of claim 10, wherein the at least one processor is further programmed to enforce the updated network policy by preventing certain information from being sent by or received by a member of the group when the certain information exceeds the usage thresholds, is not from an approved resource, or does not include approved content.

12. The system of claim 10, wherein the at least one processor is further programmed to:
extract a username from the packet stream; and
determine a user associated with the username using in the directory server.

13. A non-transitory computer readable medium comprising computer-readable instructions thereon that instruct one or more processors to:
receive, after an authentication exchange process, a packet stream sent from a network host prior to the packet stream reaching a network resource comprising access to one or more applications;
identify an authentication exchange packet in the packet stream, the authentication exchange packet being associated with the authentication process, wherein the authentication exchange packet includes authenticated information;
determine, using the authentication exchange packet and a directory service, a user associated with the packet stream and whether the user has authorization to access the network resource and the one or more applications; and
create a network policy based on the identifying and the determining, the network policy defining whether the user has access to the network resource and the one or more applications.

14. The non-transitory computer readable media of claim 13, further comprising computer-readable instructions thereon that instruct the one or more processors to associate the user with a group of users in the directory service that have the same network policy.

15. The non-transitory computer readable media of claim 13, further comprising computer-readable instructions thereon that instruct the one or more processors to enforce the network policy by stopping the packet stream from reaching the network resource when it is determined that the user does not have access to the network resource.

16. The non-transitory computer readable media of claim 13, further comprising computer-readable instructions thereon that instruct the one or more processors to:
monitor a usage, a resource, and content of information sent by or received by each member of a group; and
update the network policy for each member of the group based on the monitoring, the updated network policy including usage thresholds, approved resources, and approved content of information.

17. The non-transitory computer readable media of claim 16, further comprising computer-readable instructions thereon that instruct the one or more processors to enforce the updated network policy by preventing certain information from being sent by or received by a member of the group when the certain information exceeds the usage thresholds, is not from an approved resource, or does not include approved content.

18. The non-transitory computer readable media of claim 13, further comprising computer-readable instructions thereon that instruct the one or more processors to:
monitor a rate at which information is sent by or received by a group of users; and
generate a network policy for the group based on the monitoring, the network policy for the group including information rate thresholds.

19. The non-transitory computer readable media of claim 18, further comprising computer-readable instructions thereon that instruct the one or more processors to enforce the network policy of the group by reducing a rate at which information can be sent by or received by the group when the rate at which information is sent by or received by the group exceeds one or more of the information rate thresholds.

* * * * *